US011969842B2

(12) United States Patent
Miyake

(10) Patent No.: US 11,969,842 B2
(45) Date of Patent: Apr. 30, 2024

(54) MACHINE TOOL

(71) Applicant: TAKISAWA MACHINE TOOL CO., LTD., Okayama (JP)

(72) Inventor: Naruhito Miyake, Okayama (JP)

(73) Assignee: TAKISAWA MACHINE TOOL CO., LTD., Okayama (JP)

(*) Notice: Subject to any disclaimer, the term of this patent is extended or adjusted under 35 U.S.C. 154(b) by 634 days.

(21) Appl. No.: 17/166,220

(22) Filed: Feb. 3, 2021

(65) Prior Publication Data

US 2021/0283733 A1  Sep. 16, 2021

(30) Foreign Application Priority Data

Mar. 13, 2020 (JP) ................. 2020-044135

(51) Int. Cl.
*B23Q 1/26* (2006.01)

(52) U.S. Cl.
CPC .................. *B23Q 1/262* (2013.01)

(58) Field of Classification Search
CPC .............. B23B 25/06; B23B 2250/00; B23B 2260/104; B23B 2260/128; B23Q 16/021; B23Q 17/22; B23Q 17/2233; B23Q 23/00; B23Q 2717/003
See application file for complete search history.

(56) References Cited

U.S. PATENT DOCUMENTS

| 6,615,697 B2 | 9/2003 | Nakagawa |
| 2014/0249664 A1* | 9/2014 | Otsubo .................. G05B 19/19 700/160 |

FOREIGN PATENT DOCUMENTS

| JP | 2007160461 A | * | 6/2007 |
| JP | H4351379 B2 | | 10/2009 |
| JP | 2011240423 A | * | 12/2011 |

* cited by examiner

Primary Examiner — Sunil K Singh
Assistant Examiner — Eric Daniel Whitmire
(74) Attorney, Agent, or Firm — Pearne & Gordon LLP

(57) ABSTRACT

A machine tool with a spindle stock 20 and a tool rest 40 mounted on a bed 11, in which the spindle stock 20 and the tool rest 40 are able to relatively move in an X-axis direction that is a diameter direction of a spindle and a Z-axis direction that is an axial direction of the spindle, includes: a linear scale 50 disposed over the spindle stock 20 and the tool rest 40 on an upper side in the X-axis direction to detect position information in the X-axis direction; and a rail 23 extending in the Z-axis direction, and the linear scale 50 moves in the Z-axis direction while guided by the rail 23 integrally with either the spindle stock 20 or the tool rest 40 when the spindle stock 20 and the tool rest 40 relatively move in the Z-axis direction.

6 Claims, 12 Drawing Sheets

MACHINE TOOL

TECHNICAL FIELD

The present disclosure relates to a machine tool with a spindle stock and a tool rest mounted on a bed.

BACKGROUND

As position control for a tool rest or the like in a numerical control (NC) lathe that is a lathe provided with an NC equipment, closed loop control is known. The control is adapted such that position information of the tool rest moving owing to rotation of a ball screw is detected by a linear scale (linear encoder) placed in the vicinity of a sliding portion between a bed and the tool rest and the detection value is fed back to the NC equipment to control the position of the tool rest or the like. According to the control, the position to which the tool rest has moved is read directly by the linear scale, and it is thus possible to perform control with high precision with less influences of abrasion, thermal expansion, and the like of the ball screw.

On the other hand, if an inclination occurs in a spindle stock that supports a work due to thermal expansion or thermal deformation, the position of the work is also displaced. Accurate feedback is originally needed about the distance between a tool tip and a work center (spindle center) in order to realize highly precise machining. However, although the position where the linear scale is typically placed in the related art is not likely to be affected by abrasion, thermal expansion, and the like of the ball screw as described above, the position displacement of the spindle stock is not taken into consideration.

In this regard, a machine tool described in JP 4351379 B is adapted such that a scale portion of position measurement means (linear scale) is attached to upper surfaces of a spindle stock and a feeding base and a position at which the scale portion is attached to the spindle stock is set near a machining origin, thereby enabling control based on position information with reference to the machining origin, and even if displacement in an X-axis direction, such as an inclination, occurs in the spindle stock that supports a work, the displacement is also fed back by the linear scale, thereby enabling highly precise machining.

However, the machine tool described in JP 4351379 B does not take displacement on a tool rest side into consideration although the machine tool prevents degradation of machining precision even if a minute inclination occurs in the spindle stock due to thermal expansion or thermal deformation. Specifically, a turret tool rest 10 can move forward and backward in a Z-axis direction from the feeding base via a turret shaft in FIG. 2 in JP 4351379 B. In a state in which the turret tool rest 10 is located away from the scale portion in this configuration, the distance between the scale portion and a tool 16 increases, and the position of the tool 16 is affected by thermal expansion or thermal deformation and is also likely to be displaced due to geometric precision of a mechanism for moving forward and backward.

On the other hand, a value read by a reading portion of the scale portion indicates a distance between the machining origin on the side of the spindle stock 7 and the reading portion secured to the feeding base 9. In this case, even if some displacement occurs between the feeding base 9 and the tool 16 due to thermal expansion, thermal deformation, or the like, the displacement is not reflected at all to the value read by the scale portion.

The present disclosure has been made in order to solve the aforementioned problems in the related art, and an object thereof is to provide a machine tool reading a scale value with enhanced precision in consideration of degradation of precision in reading a scale value due to thermal expansion, thermal deformation, or the like not only on a spindle stock side but also on a tool rest side.

SUMMARY

In order to achieve the aforementioned object, a machine tool according to the present disclosure is a machine tool with a spindle stock and a tool rest mounted on a bed, the spindle stock and the tool rest being able to relatively move in an X-axis direction that is a diameter direction of a spindle and a Z-axis direction that is an axial direction of the spindle, the machine tool including: a linear scale disposed over the spindle stock and the tool rest on an upper side in the X-axis direction to detect position information in the X-axis direction; and a rail extending in the Z-axis direction to guide movement of the linear scale in the Z-axis direction, in which the linear scale moves in the Z-axis direction while guided by the rail integrally with either the spindle stock or the tool rest when the spindle stock and the tool rest relatively move in the Z-axis direction.

According to the machine tool of the present disclosure, the linear scale is disposed over the spindle stock and the tool rest on the upper side, and the position of the linear scale is thus close to both a tool attachment portion and a work gripping portion. In other words, since measurement can be performed at a position closer to a portion corresponding to the distance between a tool tip and a work center, which is an original measurement target, in this configuration, the position detection value obtained by the linear scale is less affected by thermal expansion or thermal deformation of the spindle stock and the tool rest and is thus highly precise.

Also, since with the configuration in which the linear scale is disposed over the spindle stock and the tool rest that can relatively move in the Z-axis direction, the linear scale is also configured to be moveable in parallel, the state in which the linear scale is disposed over the spindle stock and the tool rest on the upper side is maintained even if the spindle stock and the tool rest relatively move in the Z-axis direction. In addition, since a positional relationship between a measurement reference position set in the linear scale and the position of a tool tip or the position of a work center, which is a position of one end of the distance that is an original measurement target, in the X-axis direction is constantly maintained regardless of the positions of the spindle stock and the tool rest in the Z-axis direction owing to the linear scale moving in parallel, the position detection value obtained by the linear scale is not affected by the positions of the spindle stock and the tool rest in the Z-axis direction and is thus stable.

The machine tool according to the present disclosure preferably has each of the following configurations. The linear scale preferably includes a scale with scale marks and a scale reader configured to read the scale marks, and a measurement reference position of the scale marks of the scale is preferably on a central axis of the spindle in the X-axis direction. With this configuration, the scale reader can directly detect the distance from a machining center of the work to a reading position, and detection precision is thus enhanced. In other words, since the measurement reference position of the scale marks of the scale is on the central axis of the spindle, only displacement of a corresponding portion from the spindle center (the machining center of the work) to the scale mark reading position may be a factor of an error, and it is possible to localize the factor of an error and to achieve enhanced detection precision. Although as displacement of the spindle, a casing may undergo thermal deformation radially from a rotation center of the spindle, the measurement reference position of the scale is still on the central axis of the spindle even if the spindle stock is thermally deformed in the configuration in which the measurement reference position of the scale is on the central axis of the spindle. In other words, the measurement reference position of the scale is not displaced in the X-axis direction, and this is also advantageous for securing high detection precision.

The rail preferably extends on the central axis of the spindle along the central axis. If the tool rest moves in the Z-axis direction in this configuration, the linear scale also moves in parallel integrally with the tool rest, it is thus possible to perform measurement from an arbitrary position on the spindle central axis to the tool rest regardless of the positions of the spindle stock and the tool rest in the Z-axis direction, and the position detection value obtained by the linear scale is not affected by the positions of the spindle stock and the tool rest in the Z-axis direction and is thus stable. In other words, it is possible to stably measure the positions of the tool tip on a turret that is integral with the tool rest and the spindle center that is the machining center of the work, which are portions where it is originally desired to perform accurate measurement.

The linear scale preferably further includes a scale support plate disposed over the spindle stock and the tool rest on the upper side in the X-axis direction, and the scale is preferably provided on a lower surface of the scale support plate. Since the scale is located below the scale support plate in this configuration, the scale is not located too far from the positions of the tool and the work. In other words, it is possible to perform measurement at a location closer to a portion corresponding to the distance between the tool tip and the work center, which is an original measurement target, with this configuration, and this is advantageous for preventing a measurement error.

A space is preferably included between the rail and the spindle stock. Since heat of the spindle stock which is a heat generating portion is not transmitted directly to Z-axis rails in this configuration, heat transmission to the linear scale via the Z-axis rails is curbed, and this is advantageous for preventing a measurement error due to influences of the heat.

The spindle stock and the tool rest are preferably disposed inside a main body case, and the inside of the main body case is preferably sectioned into a machining chamber and a non-machining chamber by a sectioning plate with the linear scale and the rail disposed in the non-machining chamber. Since machining chips generated in the machining chamber do not adhere to the linear scale and the rail in the non-machining chamber in this configuration, it is possible to prevent precision of a linear scale moving mechanism from being degraded due to foreign matters.

Effects of the present disclosure are as described above. In summary, according to the present disclosure, since the linear scale is disposed over the spindle stock and the tool rest on the upper side, the position detection value obtained by the linear scale is less affected by thermal expansion or thermal deformation of the spindle stock and the tool rest and is thus highly precise. Also, since the linear scale is configured to be moveable in parallel, the state in which the linear scale is disposed over the spindle stock and the tool rest on the upper side is maintained even if the spindle stock and the tool rest relatively move in the Z-axis direction. In addition, since the positional relationship between the measurement reference position set in the linear scale and the position of the tool tip or the position of the work center, which is a position of one end of the distance that is an original measurement target, in the X-axis direction is constantly maintained regardless of the positions of the spindle stock and the tool rest in the Z-axis direction owing to the linear scale moving in parallel, the position detection value obtained by the linear scale is not affected by the positions of the spindle stock and the tool rest in the Z-axis direction and is thus stable.

DETAILED DESCRIPTION OF THE EMBODIMENTS

Figure 1:
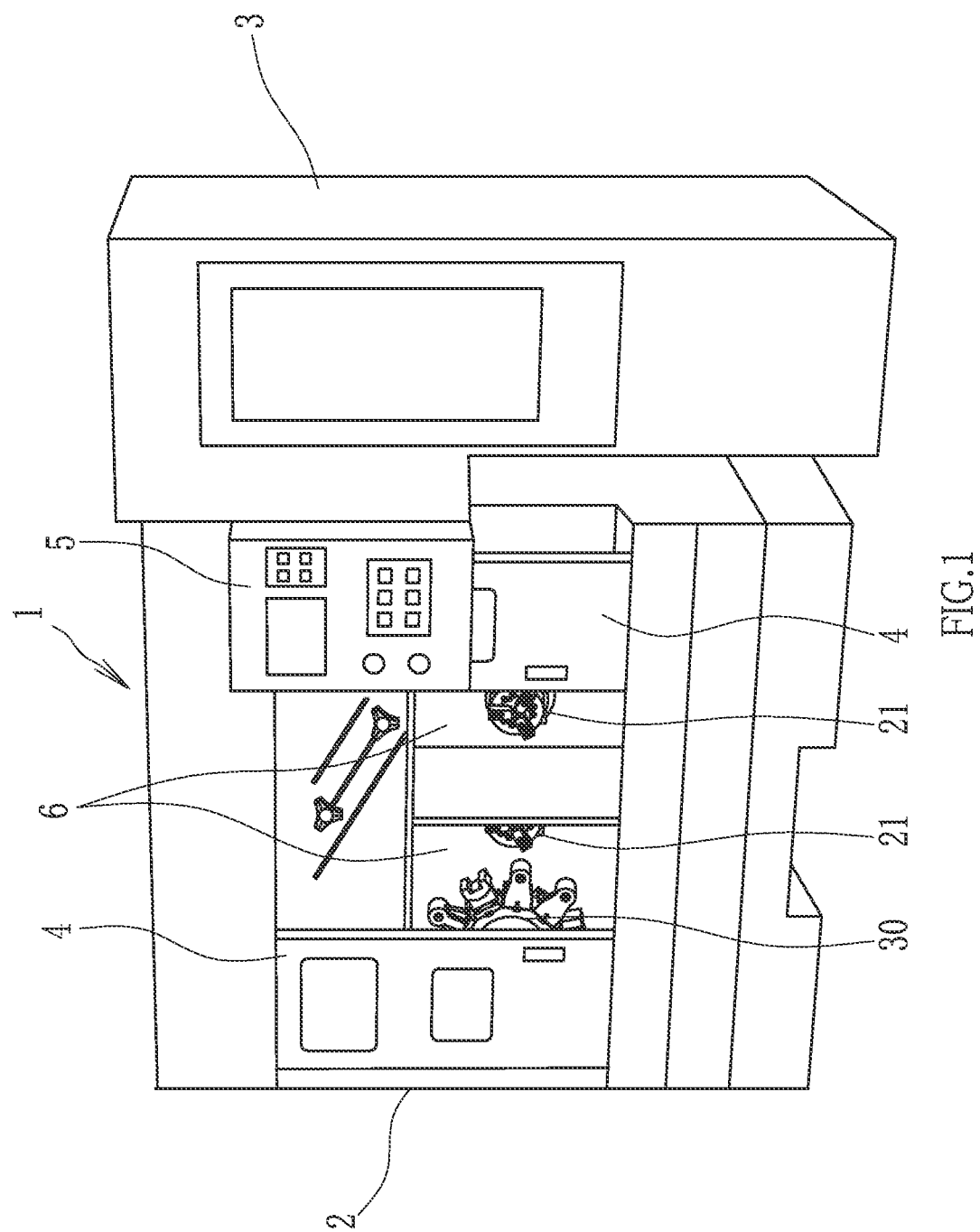
FIG. 1 is an exterior perspective view of a machine tool according to an embodiment of the present disclosure.

Hereinafter, an embodiment of the present disclosure will be described with reference to drawings. FIG. 1 is an exterior perspective view of a machine tool 1 according to an embodiment of the present disclosure. The machine tool 1 is illustrated in a state in which a front door 4 thereof is opened, and main mechanisms such as a numerical control (NC) lathe, which is a machine tool main body 10 (see FIG. 2) and a work transport mechanism are included inside the front door 4. A work feeder 3 that is a main part of the work transport mechanism is disposed to be adjacent to a main body case 2. A work is passed and received to and from the machine tool main body 10 inside the main body case 2 via the work feeder 3. The machine tool main body 10 is controlled by a numerical control (NC) equipment, and various operations and settings can be made using an operation panel 5.

Figure 2:
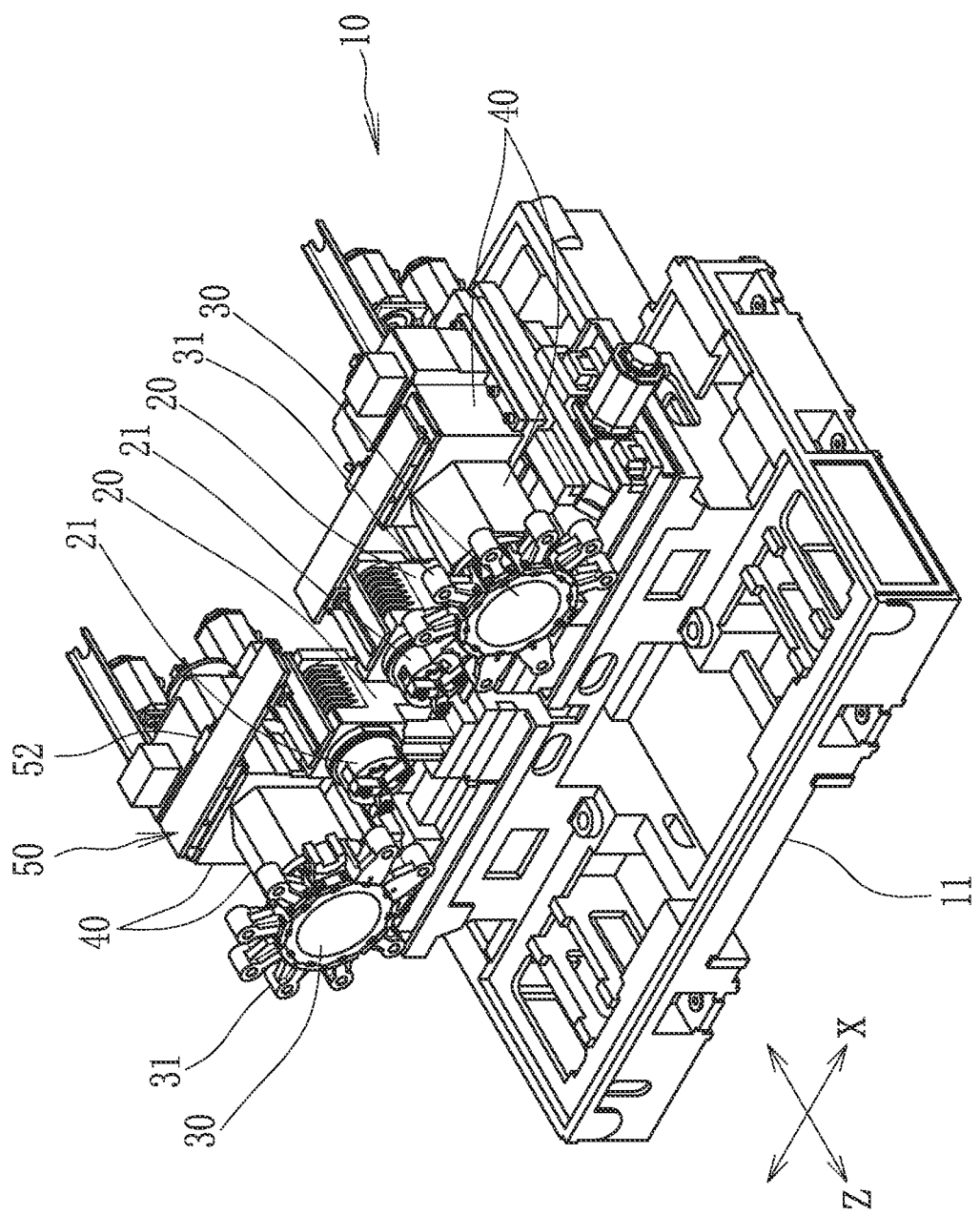
FIG. 2 is an exterior perspective view illustrating a machine tool main body according to an embodiment of the present disclosure.

FIG. 2 is an exterior perspective view illustrating the machine tool main body 10 inside the machine tool 1. Referring to FIG. 2, an overview of the machine tool main body 10 will be described. The machine tool main body 10 is a parallel two-spindle lathe disposed such that an axial center of a spindle is directed in the horizontal direction, and two spindle stocks 20 are disposed in parallel on a bed 11. Each spindle stock 20 has a spindle therein, and a chuck 21 is attached to the spindle. A work (not illustrated) that is a machining target is gripped by the chuck 21. A tool rest 40 is disposed beside each spindle stock 20. A turret 30 is attached to the tool rest 40, and a plurality of holders 31 are radially attached to the turret 30. Tools (not illustrated) such as a turning tool and a drill are attached to the holders 31.

Hereinafter, a diameter direction of the spindle will be referred to as an X-axis direction, and a central axis direction of the spindle will be referred to as a Z-axis direction in the present embodiment. In FIG. 2, a rotating work gripped by the chuck 21 is machined with a tool attached to the turret 30 with the tool rest 40 moving in the X-axis direction and the Z-axis direction. In the present embodiment, the tool rest 40 is a casing portion that incorporates a mechanism for rotating the turret therein.

Figure 3:
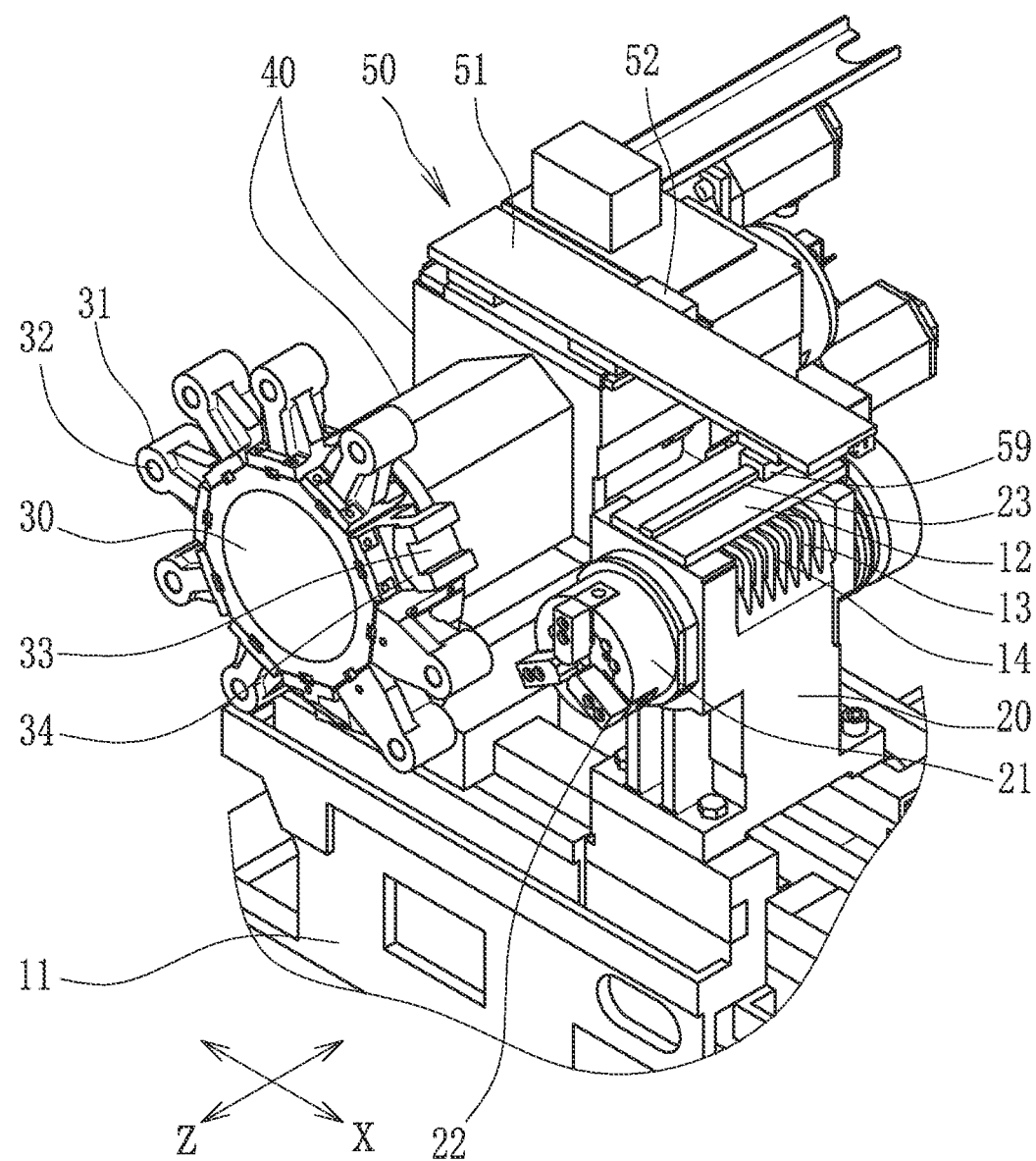
FIG. 3 is a partial enlarged view of the machine tool main body in FIG. 2.
Figure 4:
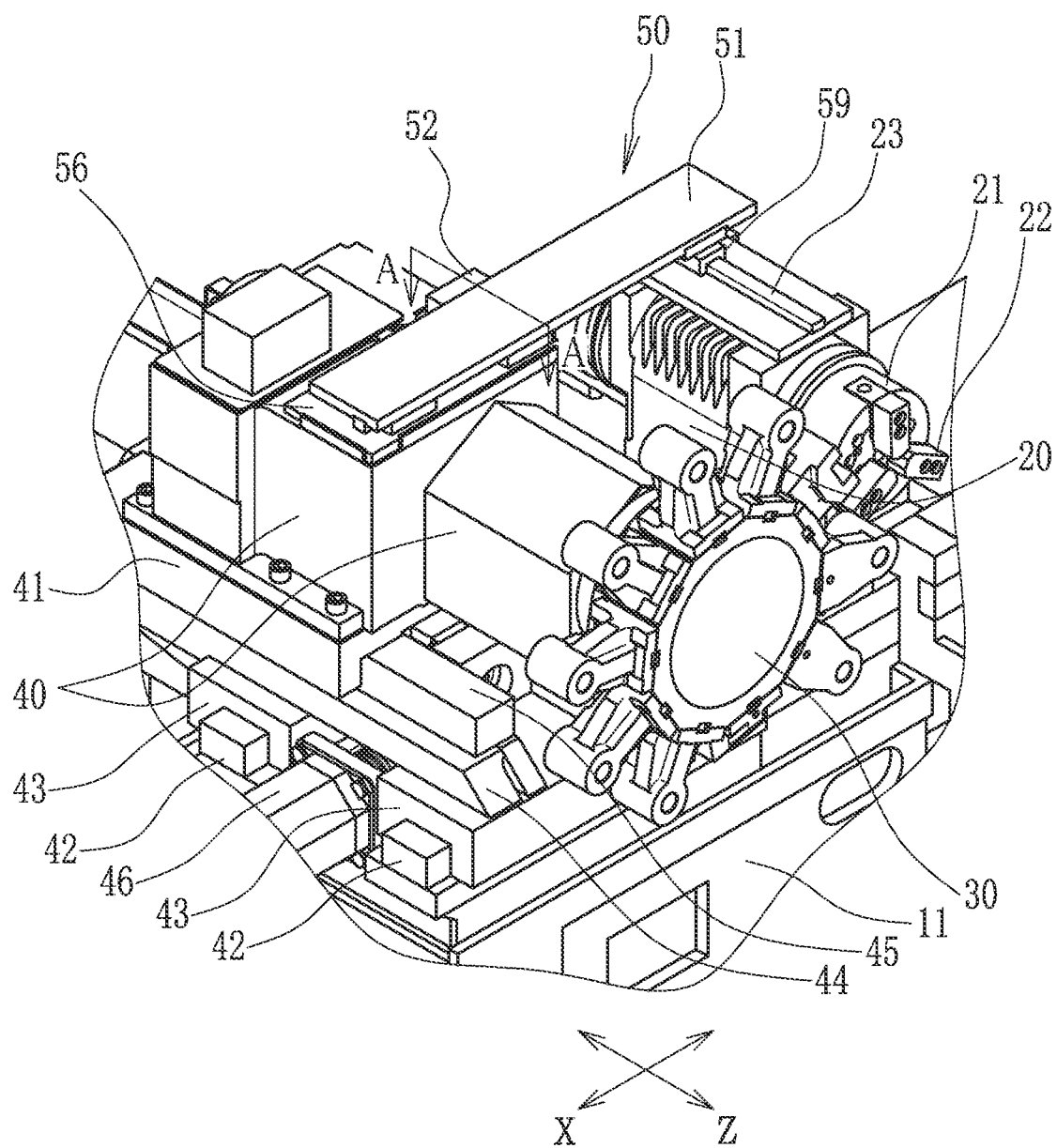
FIG. 4 is an exterior perspective view of a structure in FIG. 3 when seen from the left side.
Figure 5:
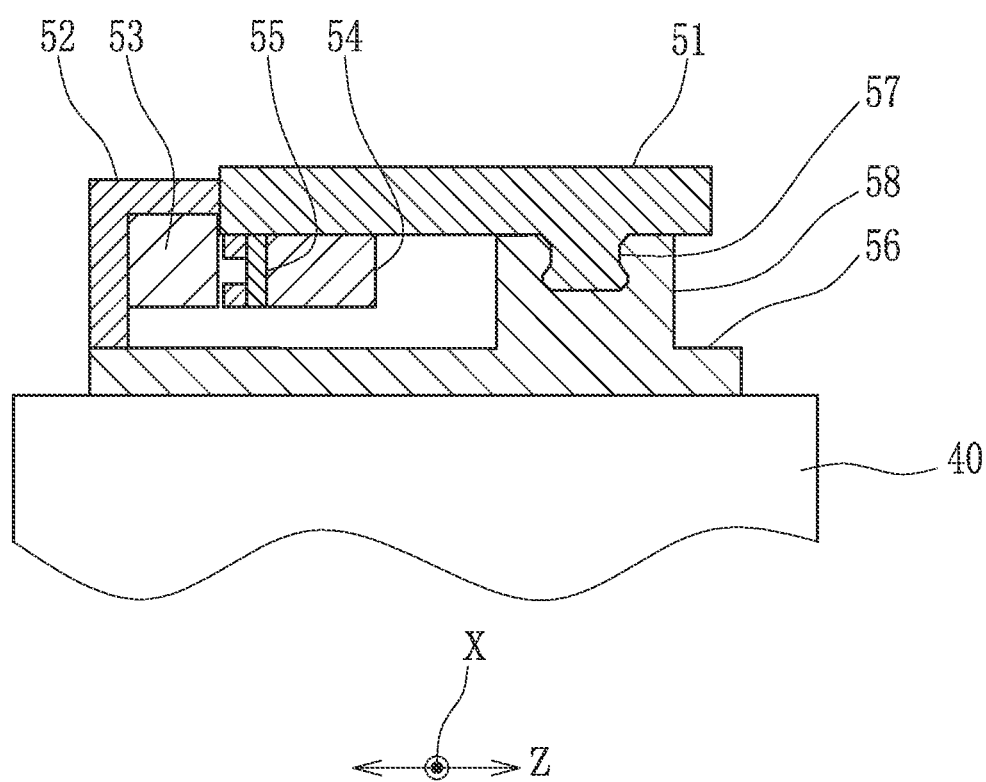
FIG. 5 is a sectional view taken along the line AA in FIG. 4.
Figure 6:
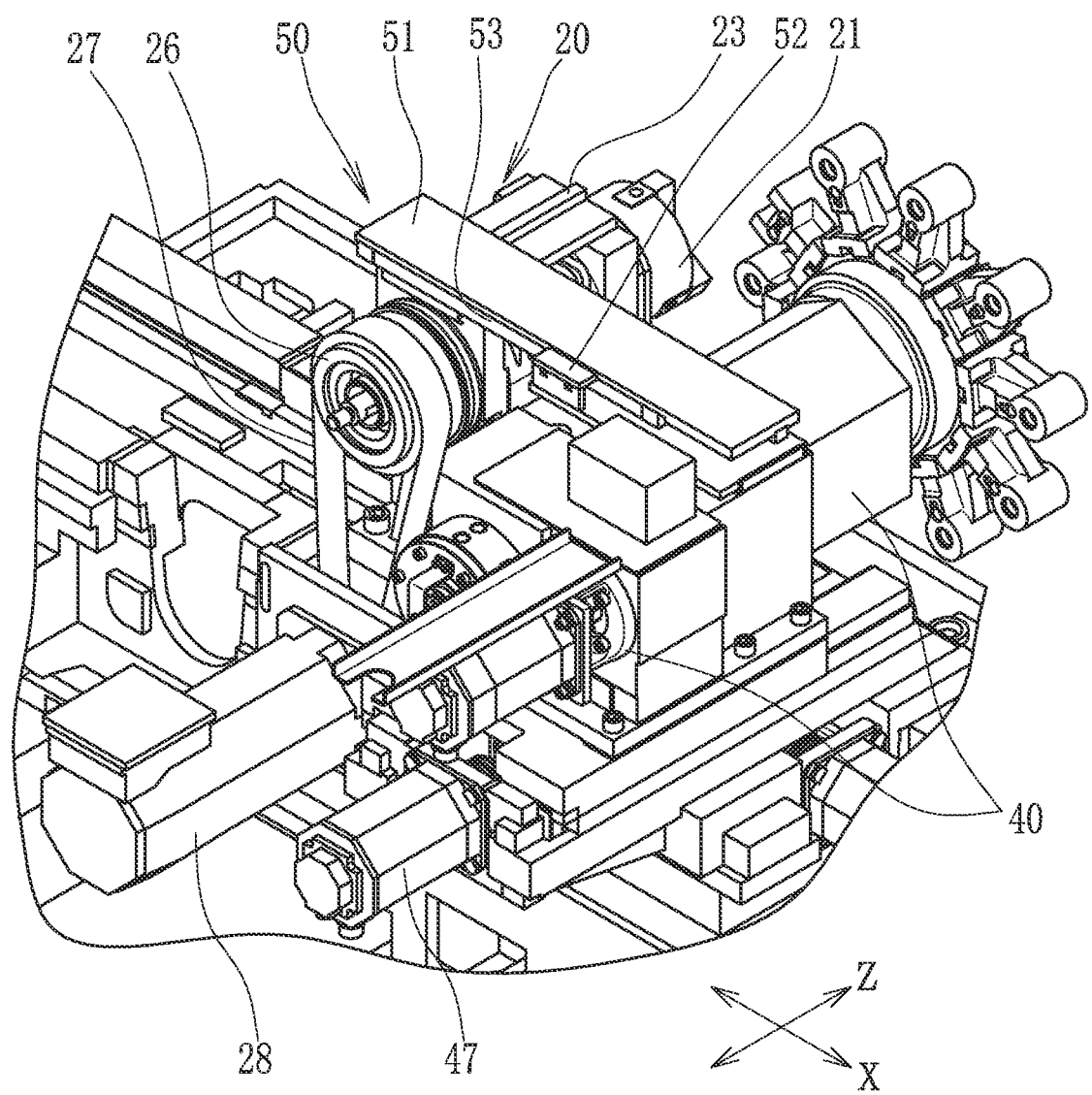
FIG. 6 is an exterior perspective view of the structure in FIG. 3 when seen from the back side.

FIG. 3 is a partially enlarged view of the machine tool main body 10 in FIG. 2 and illustrates one set of the spindle stock 20 and the tool rest 40 and the vicinity thereof. FIG. 4 is an exterior perspective view of the structure in FIG. 3 when seen from the left side, FIG. 5 is a sectional view taken along the line AA in FIG. 4, and FIG. 6 is an exterior perspective view of the structure in FIG. 3 when seen from the back side. Hereinafter, the one set of the spindle stock 20 and the tool rest 40 will be described with reference to FIGS. 3 to 6. However, the same applies to the other one set.

As illustrated in FIG. 3, a claw 22 is secured to the chuck 21, and the work is pinched and gripped with the claw 22 at the center portion of the chuck 21. The holders 31 with through-holes 32 formed therein and a holder 34 with a groove 33 formed therein are attached to the turret 30. A drill shank (handle) is attached to each through-hole 32, and a turning tool shank (handle) is attached to the groove 33.

In FIG. 3, both the spindle stock 20 and the tool rest 40 are mounted on the bed 11, and the spindle stock 20 is secured to the bed 11 while the tool rest 40 moves in the X-axis direction and the Z-axis direction. More specifically, an X-axis feeding base 44 is secured to a pair of X-axis sliders 43 in FIG. 4. The X-axis sliders 43 are engaged with X-axis rails 42. Z-axis rails 45 are secured to the X-axis feeding base 44, and a Z-axis feeding base 41 that is integral with the tool rest 40 is engaged with Z-axis rails 45. The Z-axis rails 45 are provided on both left and right sides of the tool rest 40.

With this configuration, the tool rest 40 moves in the X-axis direction integrally with movement of the X-axis feeding base 44 and moves in the Z-axis direction integrally with movement of the Z-axis feeding base 41. The X-axis feeding base 44 and the Z-axis feeding base 41 move owing to rotation of ball screws (not illustrated). The ball screw that causes the X-axis feeding base 44 to move is driven by an X-axis drive motor 46, and the ball screw that causes the Z-axis feeding base 41 to move is driven by a Z-axis drive motor 47 (see FIG. 6).

Although a rectangular slide is used as a mechanism for causing the tool rest 40 to move in the present embodiment, the mechanism is not limited thereto, and a linear guide may be used. The rectangular slide has high rigidity and provides stable precision in a long period of time. The linear guide performs linear motion in response to rolling of a ball and has high responsiveness.

A linear scale 50 is disposed over the spindle stock 20 and the tool rest 40 on the upper side in the X-axis direction in FIG. 4. A rail holder 59 is integral with a scale support plate 51, and the rail holder 59 is engaged with the rail 23. The rail 23 is secured to the spindle stock 20 and extends on the central axis of the spindle along the central axis to guide movement of the linear scale 50 in the Z-axis direction. As will be described later, the scale support plate 51 is provided on the tool rest 40 via a fixed base 56. If the tool rest 40 moves in the Z-axis direction in this configuration, the linear scale 50 is guided by the rail 23 integrally with the tool rest 40 and moves in the Z-axis direction with the rail holder 59 sliding on the rail 23.

Referring to FIG. 5 which is a sectional view taken along the line AA in FIG. 4, the linear scale 50 will specifically be described. In FIG. 5, the fixed base 56 is secured to the tool rest 40. A rail holder 58 that is integral with the fixed base 56 is engaged with a scale support plate rail 57 that is integral with the scale support plate 51, and the fixed base 56 is slidably engaged with the scale support plate 51. A scale 55 is supported inside a scale holder 54 attached below the scale support plate 51. A scale reader 53 is attached to the fixed base 56 via a support member 52. The scale reader 53 reads scale marks provided on the scale 55, and position information of the tool rest 40 in the X-axis direction is thus detected.

In FIG. 4, the rail holder 59 that is integral with the scale support plate 51 is engaged with the rail 23, and the movement of the scale support plate 51 in the X-axis direction is thus restricted. If the tool rest 40 moves in the X-axis direction in FIG. 5 in this configuration, the fixed base 56 and the scale reader 53 move in the X-axis direction internally with the tool rest 40. On the other hand, the scale support plate 51 does not move, and the scale 55 supported by the scale support plate 51 also does not move. This enables the scale reader 53 to read the scale marks on the fixed scale 55 while moving in the X-axis direction integrally with the tool rest 40 and detect the position information of the tool rest 40 in the X-axis direction.

In FIG. 5, the scale 55 is supported below the scale support plate 51 as described above. With this configuration, it is possible to form clearances between the scale 55 and the tool rest 40 and between the scale 55 and the spindle stock 20, and this is advantageous for preventing a measurement error of the scale 55 due to influences of heat from the tool rest 40 and the spindle stock 20 that are heat generating portions. Also, since the scale 55 is located below the scale support plate 51, the scale 55 is not located too far from the positions of the tool and the work even if the clearances as described above are formed. In other words, according to the configuration, it is possible to perform measurement at a position closer to a portion corresponding to the distance between the tool tip and the work center, which is an original measurement target, as compared with a case in which the scale 55 is disposed directly on an upper portion of the scale support plate rail 57, and this is also advantageous for preventing a measurement error due to influences of heat and the like.

Further, the fixed base 56 is slidably engaged with the scale support plate 51 as described above, and the scale reader 53 is attached to the fixed base 56 in FIG. 5. Since the fixed base 56 with the scale reader 53 attached thereto is guided by the scale support plate rail 57 that is integral with the scale support plate 51 that supports the scale 55 and moves in this configuration, the positional relationship between the scale reader 53 and the scale 55 can be maintained with high precision during the movement of the scale reader 53.

In FIG. 6, a belt 27 is stretched between a pulley 26 on a back surface side of the spindle stock 20 and a pulley (not illustrated) of the spindle drive motor 28, and the spindle is driven by the spindle drive motor 28 via the belt 27. With this configuration, it is possible to locate the spindle drive motor 28, which is a heat generating source, at a position far from the spindle, and this is advantageous for preventing influences of heat on the spindle as compared with a built-in motor type in which a motor is incorporated directly in a spindle system.

In FIG. 3, the rail 23 is secured to a rail base 12, and a space 13 is formed between the spindle stock 20 and the rail base 12. A heat dissipation fin 14 that is integral with the spindle stock 20 is disposed in the space 13, and the space 13 is a heat dissipation space for heat dissipation of the heat from the spindle stock 20. Since the heat of the spindle stock 20 which is a heat generating portion is not transmitted directly to the rail 23 in this configuration, heat transmission to the linear scale 50 via the rail 23 is also curbed, and this is advantageous for preventing a measurement error of the scale 55 due to influences of heat.

While description of the machine tool main body 10 has been made hitherto, the machine tool main body 10 illustrated in FIG. 2 is disposed inside the main body case 2 in FIG. 1. The inside of the main body case 2 is sectioned into a machining chamber and a non-machining chamber on a rear surface side of a sectioning plate 6 by the sectioning plate 6. The turret 30 and the chuck 21 are disposed in the machining chamber. The spindle stock 20 and the tool rest 40 illustrated in FIG. 3 are disposed in the non-machining chamber, as well as the linear scale 50 and the rail 23. Since machining chips generated in the machining chamber do not adhere to the linear scale 50 and the rail 23 in the non-machining chamber in this configuration, it is possible to prevent precision of the moving mechanism for the linear scale 50 from being degraded due to foreign matters.

Figure 7:
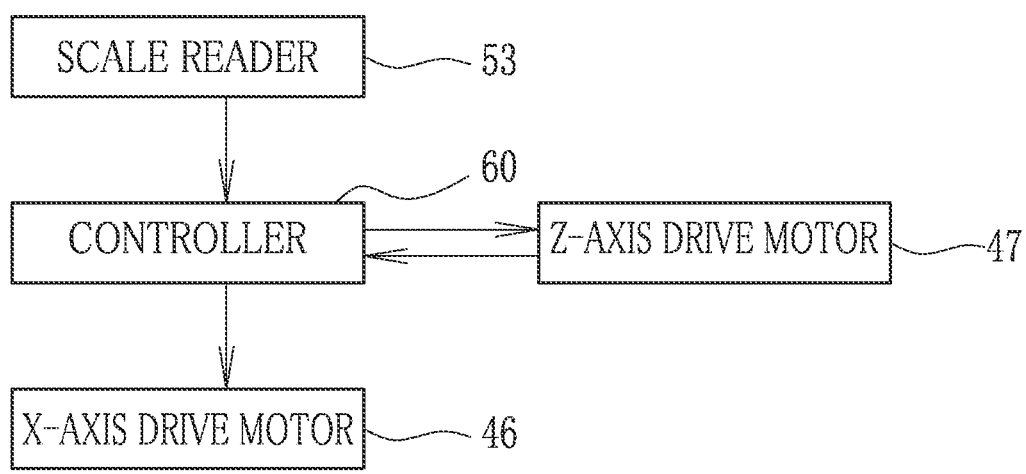
FIG. 7 is a block diagram illustrating tool rest movement control according to an embodiment of the present disclosure.

Hereinafter, movement control for the tool rest 40 will be described. FIG. 7 is a block diagram illustrating movement control for the tool rest 40. A controller 60 controls rotation of the X-axis drive motor 46 and the Z-axis drive motor 47 such that rotation of the ball screw connected to each of the motors is controlled and movement of the tool rest 40 in the X-axis direction and the Z-axis direction is controlled. For the control of the X-axis drive motor 46, closed loop control is used. That is, the position information of the tool rest 40 in the X-axis direction is detected by the scale reader 53, the detection value is fed back to the controller 60, and the X-axis drive motor 46 is controlled through comparison between the detection value and a command value.

For the control of the Z-axis drive motor 47, semi-closed loop control is used. That is, the position information of the tool rest 40 in the Z-axis direction is detected by a detector such as a rotary encoder attached to the Z-axis drive motor 47, the detection value is fed back to the controller 60, and the Z-axis drive motor 47 is controlled through comparison between the detection value and a command value. The position information of the tool rest 40 in the X-axis direction is detected by the scale reader 53 as described above while the position information of the tool rest 40 in the Z-axis direction is detected on the basis of the rotation speed or a rotation angle of the Z-axis drive motor 47.

Figure 8:
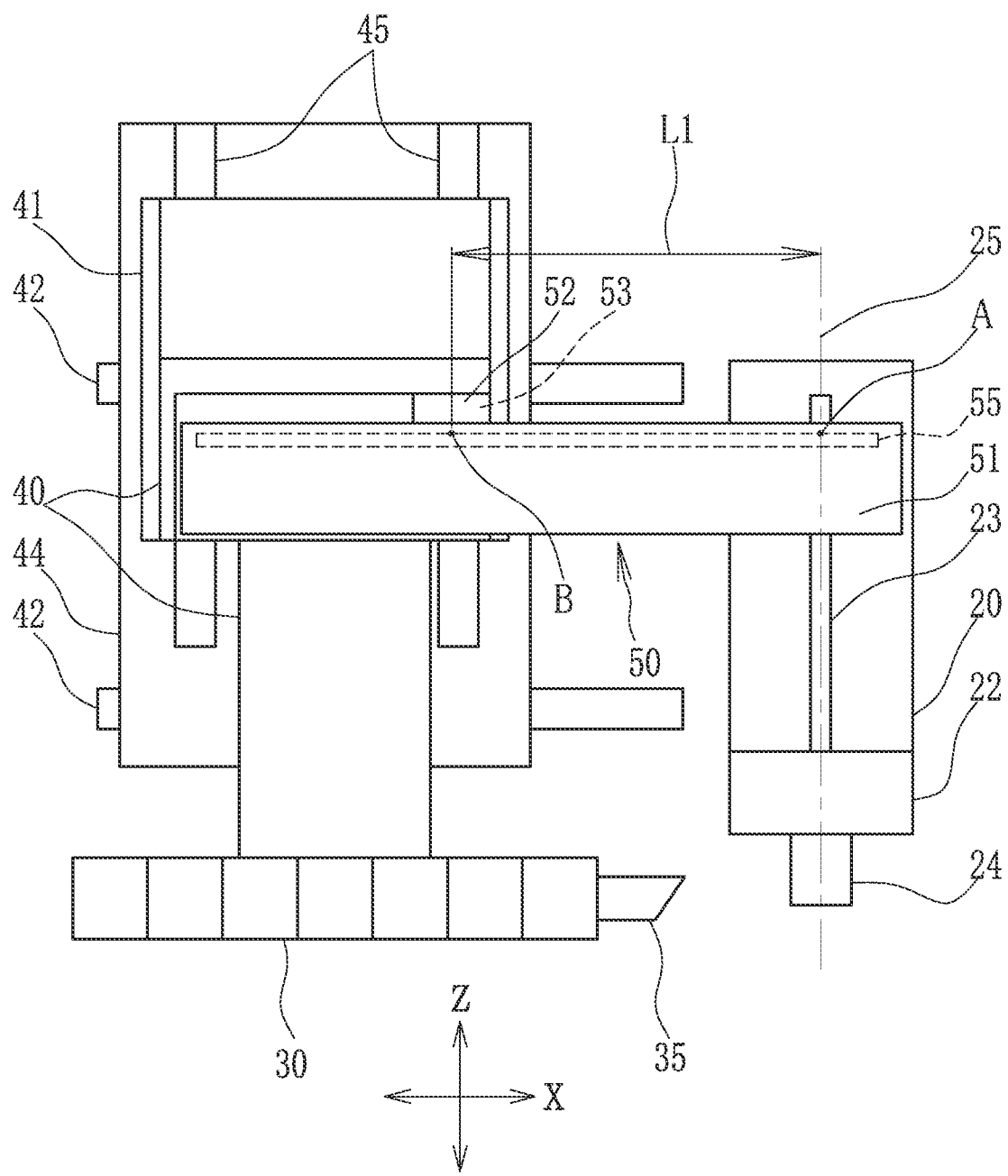
FIG. 8 is a plan view schematically illustrating a machine tool according to an embodiment of the present disclosure and is a plan view illustrating a state when an operation is started.
Figure 9:
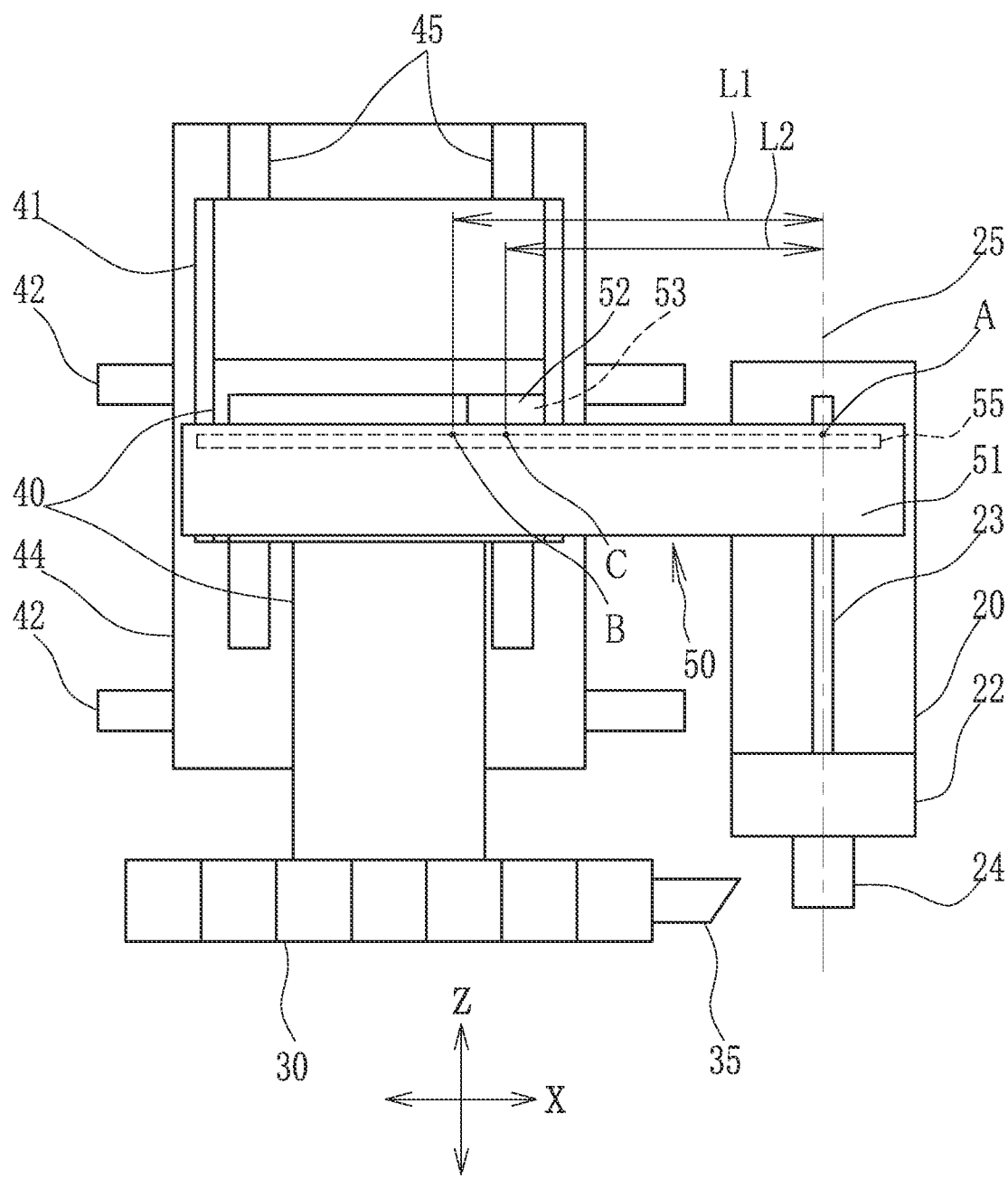
FIG. 9 is a plan view illustrating a state in which the tool rest has advanced on a spindle stock side from the state in FIG. 8.
Figure 10:
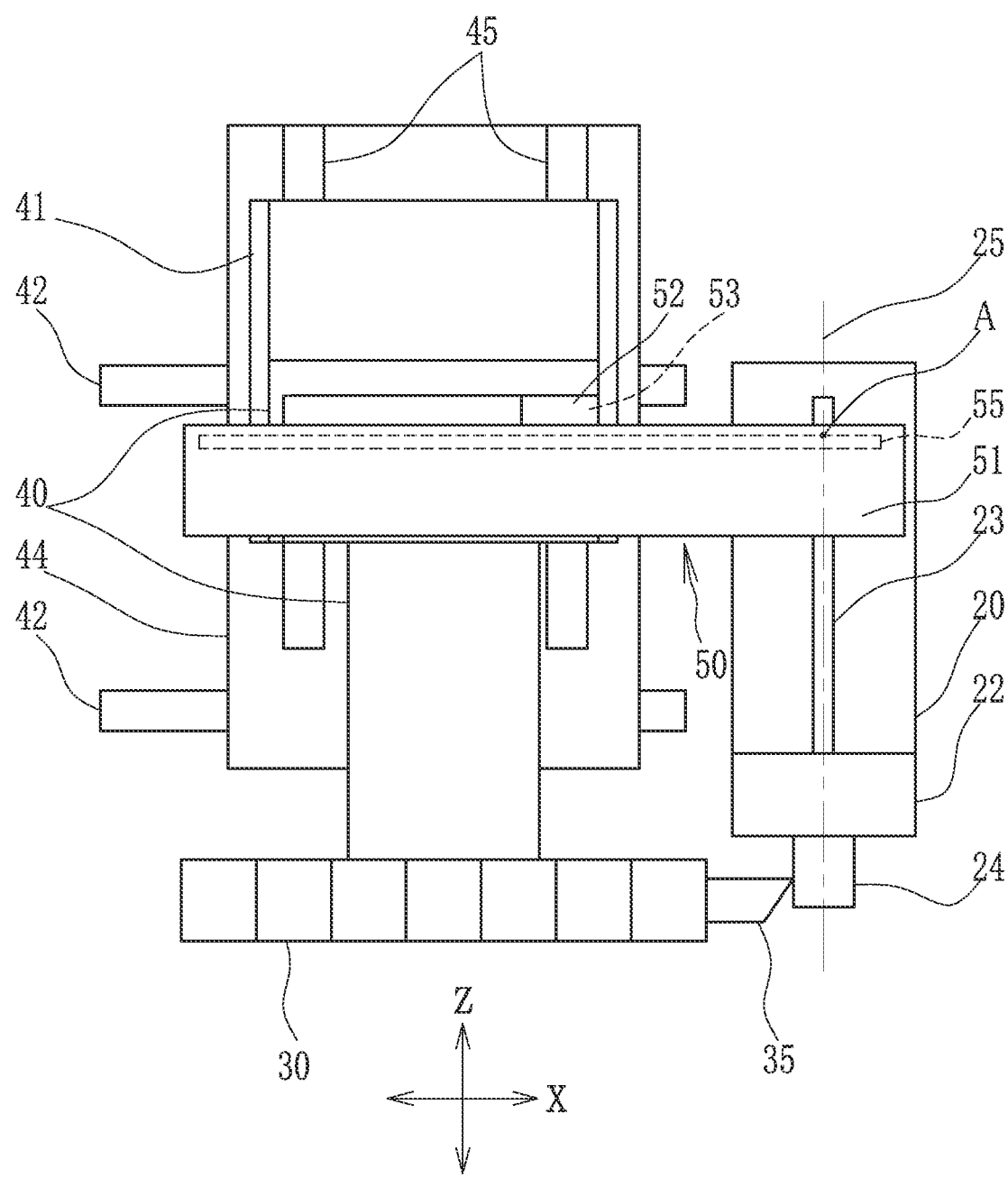
FIG. 10 is a plan view illustrating a state in which the tool rest has advanced on the spindle stock side from the state in FIG. 9 and a distal end of the tool abuts on a work.
Figure 11:
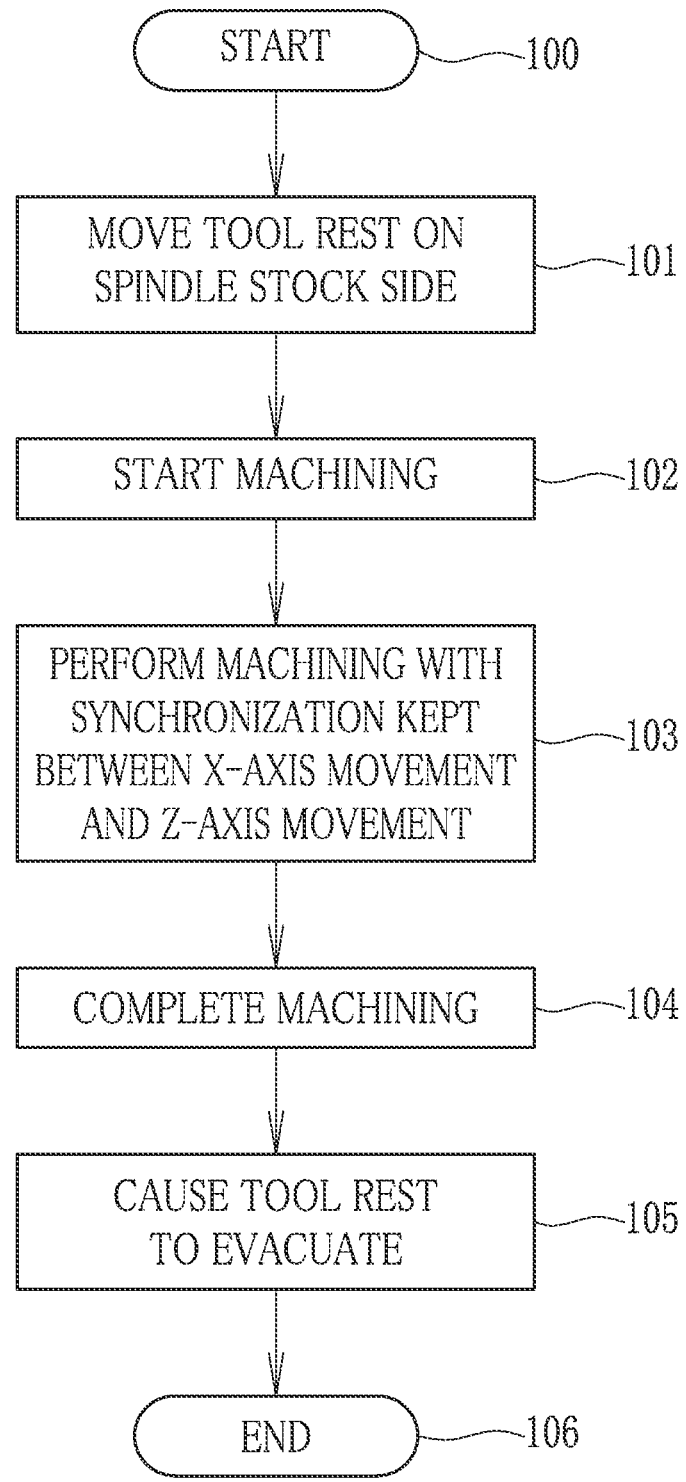
FIG. 11 is a flowchart illustrating an overview of tool rest movement control according to an embodiment of the present disclosure.
Figure 12:
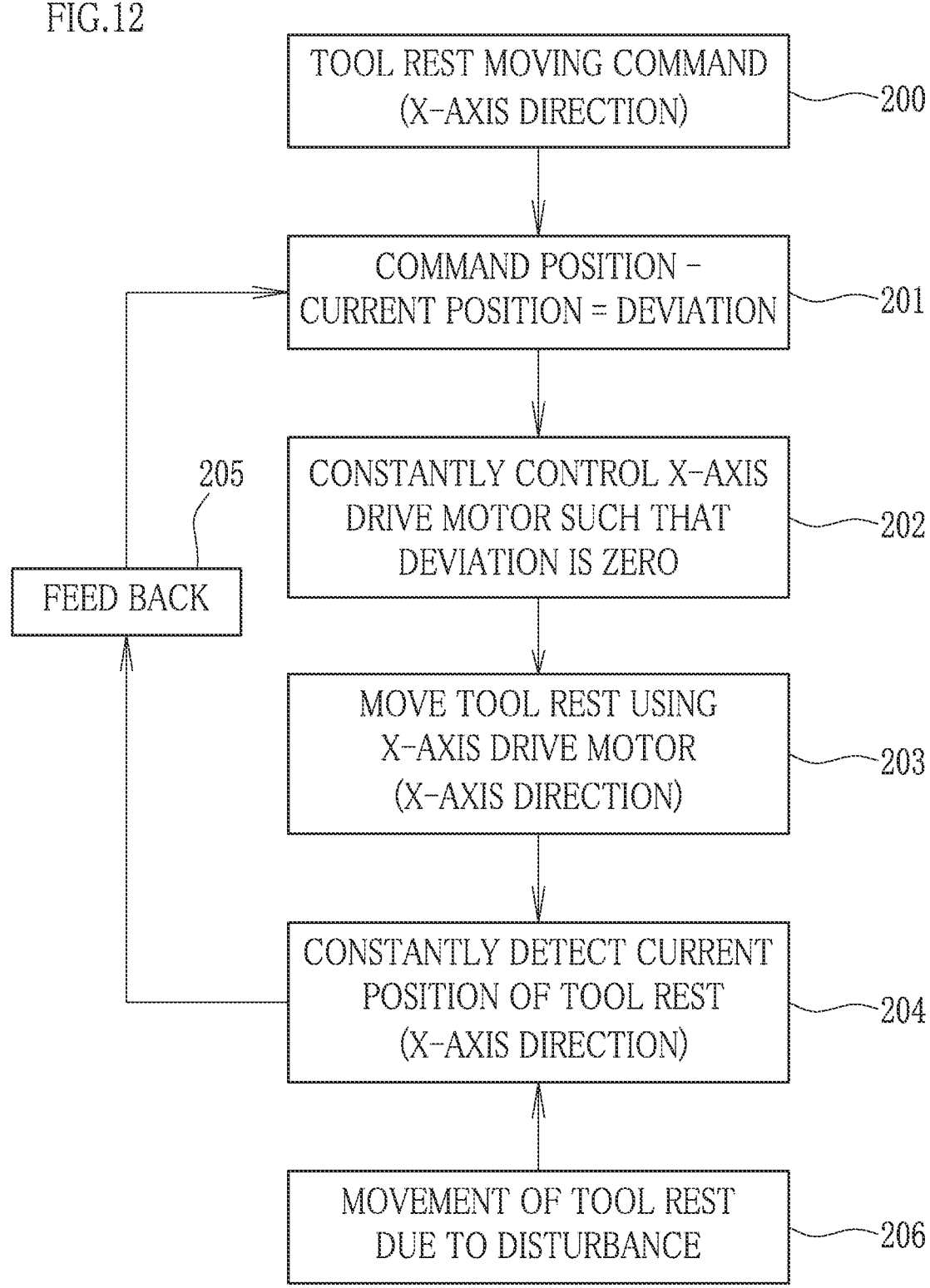
FIG. 12 is a flowchart illustrating a tool rest movement control in an X-axis direction according to an embodiment of the present disclosure.

FIGS. 8 to 10 are plan views schematically illustrating the machine tool 1 according to the present embodiment. For the sake of easy understanding, part of a structure including, as main parts, the spindle stock 20 and the tool rest 40 illustrated in FIG. 3 or the like is appropriately omitted or changed, and dimensional relationships in the structure do not necessarily conform to those in FIG. 3 or the like. FIG. 11 is a flowchart illustrating an overview of movement control for the tool rest 40, and FIG. 12 is a flowchart illustrating movement control in the X-axis direction. Hereinafter, the movement control for the tool rest 40 will be described with reference to FIGS. 8 to 12.

FIG. 8 illustrates a state of the machine tool 1 when operations are started (Step 100 in FIG. 11). In the state in the drawing, the tool rest 40 is at an evacuation position to which the tool rest 40 has evacuated from the spindle stock 20. Although a plurality of tool can be attached to the turret 30, a state in which one tool 35 is attached thereto is illustrated for convenience of explanation.

The Z-axis feeding base 41 is mounted on the X-axis feeding base 44, and the tool rest 40 is mounted on the Z-axis feeding base 41. The tool rest 40 moves in the X-axis direction by the X-axis feeding base 44 moving along the X-axis rails 42, and the tool rest 40 moves in the Z-axis direction by the Z-axis feeding base 41 moving along the Z-axis rails 45.

The support member 52 and the scale reader 53 supported by the support member 52 also move in the X-axis direction integrally with the movement of the tool rest 40 in the X-axis direction. In regard to the scale support plate 51, since the rail holder 59 (see FIG. 4) that is integral with the scale support plate 51 is engaged with the rail 23 as described above, the scale support plate 51 do not move in the X-axis direction, and the scale 55 attached to the scale support plate 51 also do not move in the X-axis direction. Therefore, the scale reader 53 can read the scale marks on the fixed scale 55 while moving in the X-axis direction integrally with the tool rest 40 and can detect the position of the tool rest 40 in the X-axis direction.

As illustrated in FIG. 8, a measurement reference position (position A) of the scale marks of the scale 55 is on a central axis 25 of the spindle included in the spindle stock 20 in the X-axis direction. Therefore, the scale reader 53 can directly detect a distance L1 from the machining center of a work 24 to a reading position (position B), and detection precision is thus enhanced. If the measurement reference position of the scale 55 in the X-axis direction is far from the central axis 25, thermal deformation or the like between the measurement reference position and the central axis 25 may not be reflected to the detection value, or displacement of a portion that does not affect machining precision may unnecessarily be reflected thereto, and an error is likely to occur in the detection value. In the configuration in which the measurement reference position of the scale 55 is on the central axis 25 of the spindle as described above, the measurement reference position of the scale 55 is still on the central axis 25 of the spindle even if the spindle stock 20 is thermally deformed, and this is also advantageous for securing high detection precision.

Note that although it is not always necessary for the measurement reference position of the scale 55 to conform to the position on the central axis 25 of the spindle, it is desirable that the measurement reference position be located in the vicinity of the position on the central axis 25 of the spindle to achieve high detection position. As will be described later, any configuration may be employed in the present disclosure as long as the spindle stock 20 and the tool rest 40 can relatively move in the X-axis direction and the Z-axis direction, and a configuration in which the measurement reference position of the scale 55 is provided on the side of the tool rest 40 may be employed.

FIG. 9 illustrates a state in which the tool rest 40 has advanced on the side of the spindle stock 20 and illustrates a state in the process of moving of the tool rest 40 in the X-axis direction (Step 101 in FIG. 11). In the drawing, the position A which is the measurement reference position of the scale 55 is an unmoving position and thus has not moved while the reading position of the scale reader 53 has moved from the position B to a position C, and the detection distance of the scale reader 53 has been reduced from L1 to L2.

For the movement control for the tool rest 40 in the X-axis direction, closed loop control is used as described above, and the control will specifically be described with reference to FIG. 12. In FIG. 12, the controller 60 (see FIG. 7; the same applies to the following description) designates the amount of movement of the tool rest 40 (see FIGS. 8 to 10; the same applies to the following description) achieved by the X-axis drive motor 46 (see FIG. 7) (Step 200 in FIG. 12). The designation is, for example, designation of the amount of movement L (minute distance) in t seconds (minute time).

Since the command position (target position) after t seconds is defined through the designation of the amount of movement in Step 200, the scale reader 53 (see FIG. 7) detects the current position of the tool rest 40 in the X-axis direction after t seconds of a setting time elapse. The controller means 60 calculates a deviation between the command position and the current position (Step 201 in FIG. 12) and causes the tool rest 40 to move in the X-axis direction with the X-axis drive motor (Step 203 in FIG. 12) while constantly controlling the X-axis drive motor 46 such that the deviation is zero (Step 202 in FIG. 12).

The current position of the tool rest 40 in the X-axis direction is constantly detected by the scale reader 53 (Step 204 in FIG. 12), the current position is fed back to the controller 60 (Step 205 in FIG. 12), and Steps 201 to 204 are repeated. Also, the tool rest 40 advances toward the spindle stock 20 (see FIGS. 8 to 10) with the amount of movement in the X-axis direction corrected through the feedback control using the detection value of the scale reader 53 even in a case in which the tool rest 40 has moved due to disturbance caused by thermal displacement, cutting resistance, or the like (Step 206 in FIG. 12).

FIG. 10 illustrates a state in which the distal end of the tool 35 abuts on the work 24 and illustrates a state in which machining using the tool 35 has been started (Step 102 in FIG. 11). Thereafter, movement of the tool rest 40 is controlled with synchronization kept between X-axis movement and the Z-axis movement, and the machining proceeds (Step 103 in FIG. 11). The movement control for the tool rest 40 in the X-axis direction described above using FIG. 12 is executed during the machining as well. If the machining is completed (Step 104 in FIG. 11), then the tool rest 40 evacuates to the original position (see FIG. 8) (Step 105 in FIG. 11), and operations for machining one work 24 are ended (Step 106 in FIG. 11).

The movement control for the tool rest 40 has been described hitherto. According to the present embodiment, since the linear scale 50 is disposed over the spindle stock 20 and the tool rest 40 on the upper side as illustrated in FIG. 3, the position of the linear scale 50 is close to both the turret 30 with tools attached thereto and the chuck 21 that grips the work. In other words, since measurement can be performed at a position closer to the portion corresponding to the distance between the tool tip and the work center, which is an original measurement target, in this configuration, the position detection value obtained by the linear scale 50 is less affected by thermal expansion or thermal deformation of the spindle stock 20 and the tool rest 40 and is thus highly precise.

According to the present embodiment, since the linear scale 50 also moves in parallel in the Z-axis direction integrally with the tool rest 40 when the tool rest 40 moves in the Z-axis direction in FIG. 8, the positional relationship between an arbitrary position on the central axis 25 of the spindle, which is the measurement reference position of the linear scale 50, and the position of the turret 30 in the X-axis direction is constantly maintained regardless of the position of the tool rest 40 in the Z-axis direction. Therefore, the position detection value obtained by the linear scale 50 is not affected by the position of the tool rest 40 in the Z-axis direction and is thus stable.

Although the configuration in which the position of the spindle stock 20 is fixed and the tool rest 40 moves in the X-axis direction and the Z-axis direction is employed in the present embodiment, the present embodiment is not limited thereto and may employ any configurations as long as the spindle stock 20 and the tool rest 40 can relatively move in the X-axis direction and the Z-axis direction. In a configuration in which the spindle stock 20 can move in the Z-axis direction among these configurations, a configuration in which the rail 23 is provided on the tool rest 40 in FIG. 8 and the linear scale 50 also moves in the Z-axis direction integrally with the spindle stock 20 when the spindle stock 20 moves in the Z-axis direction may be employed. With this configuration, the positional relationship between the arbitrary position on the central axis 25 of the spindle and the position of the tool tip of the tool 35 attached to the turret 30 (the position of one end of the distance that is an original measurement target) in the X-axis direction is still constantly maintained regardless of the position of the spindle stock 20 in the Z-axis direction, and the position detection value obtained by the linear scale 50 is not affected by the position of the spindle stock 20 in the Z-axis direction and is thus stable.

As supplementary description about the effects of the present disclosure, the state in which the linear scale 50 is disposed over the spindle stock 20 and the tool rest 40 on the upper side is maintained even if the spindle stock 20 and the tool rest 40 relatively move in the Z-axis direction with the configuration in which the linear scale 50 is disposed over the spindle stock 20 and the tool rest 40 that can relatively move in the Z-axis direction and the linear scale 50 can still move in parallel, according to the present disclosure. In addition, since the positional relationship between the measurement reference position set in the scale 55 and the position of the tool tip of the tool 35 attached to the turret 30 or the position of the work center that is the position of one end of the distance, which is the original measurement target, in the X-axis direction is constantly maintained regardless of the positions of the spindle stock 20 and the tool rest 40 in the Z-axis direction owing to the linear scale 50 moving in parallel, the position detection value obtained by the linear scale 50 is not affected by the positions of the spindle stock 20 and the tool rest 40 in the Z-axis direction and is thus stable.

Since the linear scale 50 also moves in parallel integrally with the tool rest 40 when the tool rest 40 moves in the Z-axis direction in FIG. 8 in the present embodiment, the positional relationship between the linear scale 50 and the turret 30 that is a tool attachment portion is maintained at constant positions regardless of the position of the tool rest 40 in the Z-axis direction. With this configuration, the position detection value obtained by the linear scale 50 is still not affected by the position of the tool rest 40 in the Z-axis direction and is thus stable.

REFERENCE SIGS LIST

1 Machine tool
6 Sectioning plate
10 Machine tool main body
11 Bed
13 Space (heat dissipation space)
20 Spindle stock
23 Rail
28 Spindle drive motor
42 X-axis rail
30 Turret
40 Tool rest
46 X-axis drive motor
47 Z-axis drive motor
50 Linear scale
55 Scale
51 Scale support plate
53 Scale reader
56 Fixed base
60 Controller

What is claimed is:

1. A machine tool comprising:
a spindle stock;
a tool rest mounted on a bed,
one of the spindle stock and the tool rest being able to move relatively to the other of the spindle stock or the tool rest in an X-axis direction that is a diameter direction of a spindle and in a Z-axis direction that is an axial direction of the spindle;
a linear scale disposed above the spindle stock and the tool rest partially covering the spindle stock and the tool rest when viewed in the Z-axis direction, the linear scale detecting position information in the X-axis direction; and
a rail extending in the Z-axis direction to guide movement of the linear scale in the Z-axis direction,
wherein the linear scale moves in the Z-axis direction while guided by the rail integral with either the spindle stock or the tool rest when one of the spindle stock and the tool rest moves relatively to the other of the spindle stock or the tool rest in the Z-axis direction.

2. The machine tool according to claim 1, wherein the linear scale includes a scale with scale marks, and a measurement reference position of the scale marks of the scale is on a central axis of the spindle in the X-axis direction.

3. The machine tool according to claim 1, wherein the rail extends on a central axis of the spindle along the central axis when viewed the machine tool from above.

4. The machine tool according to claim 3, wherein a space is included between the rail and the spindle stock.

5. The machine tool according to claim 2, wherein the linear scale further includes a scale support plate disposed over the spindle stock and the tool rest on the upper side in the X-axis direction, and the scale is provided on a lower surface of the scale support plate.

6. The machine tool according to claim 1, wherein the spindle stock and the tool rest are disposed inside a main body case, and the inside of the main body case is sectioned into a machining chamber and a non-machining chamber by a sectioning plate with the linear scale and the rail disposed in the non-machining chamber.

* * * * *